United States Patent [19]

Iwanami et al.

[11] Patent Number: 5,585,615
[45] Date of Patent: Dec. 17, 1996

[54] IMAGE READING APPARATUS

[75] Inventors: Shinji Iwanami; Katsura Noike; Yoshitaka Tanaka, all of Suwa, Japan

[73] Assignee: Chinon Kabushiki Kaisha, Suwa, Japan

[21] Appl. No.: 383,001

[22] Filed: Feb. 2, 1995

[30] Foreign Application Priority Data

Feb. 8, 1994 [JP] Japan .................................. 6-014574

[51] Int. Cl.⁶ ................................................ G06K 7/10
[52] U.S. Cl. ............................................ 235/472; 235/462
[58] Field of Search .................................. 235/455, 472, 235/462; 359/599, 850, 857; 382/313

[56] References Cited

U.S. PATENT DOCUMENTS

| | | |
|---|---|---|
| 4,528,444 | 7/1985 | Hara et al. |
| 4,743,773 | 5/1988 | Katana et al. ................ 235/472 |
| 4,818,847 | 4/1989 | Hara et al. ................... 235/455 |
| 5,144,117 | 9/1992 | Hasegawa et al. ........... 235/455 |
| 5,218,191 | 6/1993 | Chadima, Jr. et al. ....... 235/472 |
| 5,270,525 | 12/1993 | Ukai et al. ................... 235/472 |
| 5,313,373 | 5/1994 | Bjorner et al. ............... 362/19 |
| 5,406,060 | 4/1995 | Gitin ............................ 235/462 |
| 5,449,892 | 9/1995 | Yamada ....................... 235/472 |

FOREIGN PATENT DOCUMENTS

| | | |
|---|---|---|
| 59-163677 | 9/1984 | Japan . |
| 62-150486 | 7/1987 | Japan . |
| 63-56768 | 3/1988 | Japan . |
| 1196680A | 8/1989 | Japan . |
| 2291086A | 11/1990 | Japan . |
| 4-349585 | 12/1992 | Japan . |

*Primary Examiner*—Donald T. Hajec
*Assistant Examiner*—Mark Tremblay
*Attorney, Agent, or Firm*—Hickman Beyer & Weaver

[57] ABSTRACT

An apparatus comprises a housing having a window surrounded by an opening edge; a light source arranged in the housing; a total reflection mirror arranged in the housing; and a diffusion reflection mirror for reflecting part of light emitted from the light source toward the window and at the same time reflecting another part of the light emitted from the light source toward the total reflection mirror, wherein light reflected by the total reflection mirror is guided to the window, thereby a target object can be uniformly and brightly irradiated, and good image information can be obtained.

14 Claims, 4 Drawing Sheets

READING WIDTH

IMAGE READING APPARATUS

BACKGROUND OF THE INVENTION

1. Field of the Invention

The present invention relates to an image reading apparatus for causing an area image sensor such as a CCD (charge coupled device) to optically read an image such as a bar code or a two-dimensional dot pattern code and, more particularly, to an illumination thereof.

2. Related Background Art

A conventional image reading apparatus is described in Japanese Patent Laid-Open No. 59-163677. In this arrangement, the number of component parts is increased, the wiring operation is complicated, and the apparatus itself becomes bulky, resulting in inconvenience.

SUMMARY OF THE INVENTION

It is, therefore, an object of the present invention to provide an image reading apparatus for solving the conventional problems described above.

In order to achieve the above object of the present invention, there is provided an image reading apparatus comprising:

(a) a housing having a window surrounded by an opening edge;

(b) a light source arranged in the housing;

(c) a total reflection mirror arranged in the housing; and (d) a diffusion reflection mirror for reflecting part of light emitted from the light source toward the window and at the same time reflecting another part of the light emitted from the light source toward the total reflection mirror, wherein light reflected by the total reflection mirror is guided to the window.

The total reflection mirror has a total reflection surface for totally reflecting the light incident thereon. The diffusion reflection mirror has a diffusion reflection surface for diffusing and reflecting light incident thereon. An angle formed between a normal to a virtual plane including three points on the opening edge and a normal to the total reflection mirror is 70° or more and 80° or less. An angle formed between the normal to the virtual plane and a normal to the diffusion reflection mirror is 40° or more and 50° or less. The diffusion mirror has the diffusion reflection surface for diffusing and reflecting light incident thereon. The diffusion reflection surface is matted.

According to another aspect of the present invention, there is provided an image reading apparatus comprising a housing having a reading window and a hollow portion formed therein, a light-emitting unit arranged near the reading window of the housing, a diffusion reflection plate, arranged near the reading window of the housing, for reflecting part of light received from the light-emitting unit toward the reading window, and a total reflection plate, arranged near the reading window of the hosing at a position opposing the diffusion reflection plate, for reflecting the light received from the diffusion reflection plate toward the reading window.

The reflection surface of the diffusion reflection plate is preferably matted.

In addition, an angle formed between the diffusion reflection plate and a plane including the reading window is preferably 45°±5°, and an angle formed between the total reflection plate and the plane including the reading window is preferably 75°±5°.

With the above arrangement, part of the light received by the diffusion reflection plate is reflected toward the reading surface in the image reading apparatus of the present invention. For this reason, a reading surface portion closer to the diffusion reflection plate is bright, and a reading surface portion farther away from the diffusion reflection surface is dark. In addition, the light received by the total reflection plate is reflected toward the reading surface. For this reason, a reading surface portion closer to the total reflection plate is bright, and a reading surface portion farther away from the total reflection plate is dark.

The degree of matting on the surface of the diffusion reflection plate is changed to adjust an amount of light reflected toward the total reflection plate and an amount of light reflected toward the reading window.

Since the angle between the diffusion reflection plate and the plane including the reading window is set to 45°±5°, the light reflected by the diffusion reflection plate can be efficiently guided such that the principal direction of the reflected light is parallel to the reading window. Since the angle between the total reflection plate and the plane including the reading window is set to 75°±5°, most of the light reflected by the total reflection plate can be efficiently irradiated on the reading window.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 1:
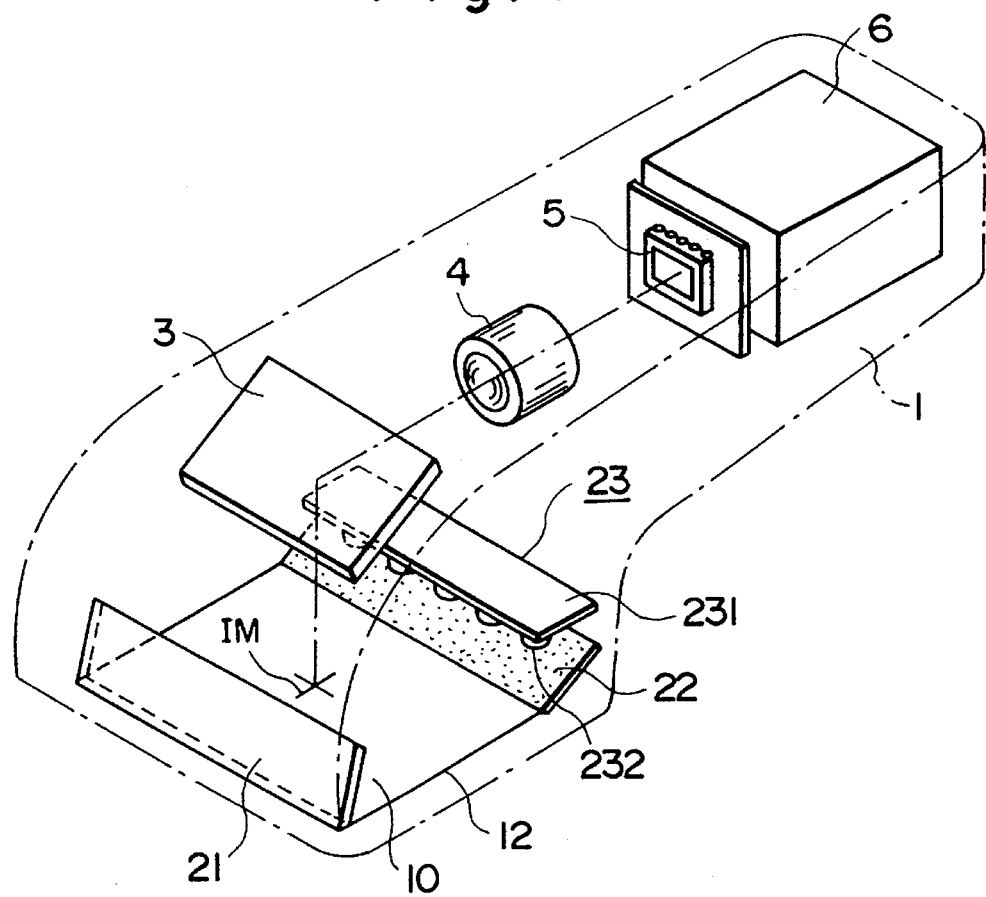
FIG. 1 is a perspective view showing an image reading apparatus according to an embodiment of the present invention.

The preferred embodiment of the present invention will be described with reference to the accompanying drawings. The same reference numerals throughout the accompanying drawings denote the same parts.

An image reading apparatus according to this embodiment of the present invention will be described with reference to FIGS. 1, 4, 5, and 6A to 6E.

This apparatus aims at reading an image IM on a target object 10.

This apparatus comprises:

(a) a housing 1 having a window 12 surrounded by an opening edge 1a;

(b) a light source 23 arranged in the housing 1;

(c) a total reflection mirror 21 arranged in the housing 1; and (d) a diffusion reflection mirror 22 for reflecting part L2 of light L1 emitted from the light source 23 toward the window 12 and at the same time reflecting another part L3 of the light L1 emitted from the light source 23 toward the total reflection mirror 21, wherein light L4 reflected by the total reflection mirror 21 is guided to the window 12.

The total reflection mirror 21 has a total reflection surface 21a for totally reflecting the light incident thereon, and the diffusion reflection mirror has a diffusion reflection surface 22a for diffusing and reflecting the light incident thereon.

An angle A1 formed between a normal N1 to a virtual plane VP including three points 1b, 1c, and 1d on the opening edge 1a and a normal N21 to the total reflection surface 21a is 70° or more and 80° or less. An angle A2 formed between the normal N21 to the virtual plane VP and a normal N22 to the diffusion reflection surface 22a is 40° or more and 50° or less.

The diffusion reflection surface 22a is matted. The diffusion reflection mirror includes the following mirrors.

Figure 6A:
FIGS. 6A to 6E are sectional views showing diffusion reflection mirrors, respectively.

The diffusion reflection mirror 22 in FIG. 6A comprises a glass plate 100 and a matted aluminum plate formed on the glass plate 100.

Figure 6B:
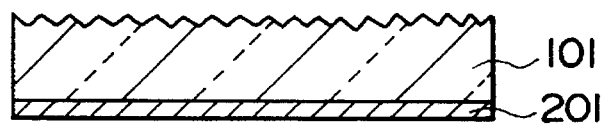

The diffusion reflection mirror 22 in FIG. 6B comprises a matted glass plate 101 and an aluminum film adhered to the lower surface of the glass plate 101.

Figure 6C:
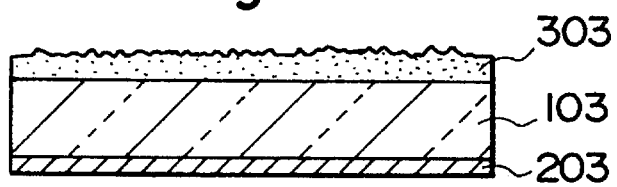

The diffusion reflection mirror 22 in FIG. 6C comprises a glass plate 103, a matted transparent film 303 adhered to the upper surface of the glass plate 103, and an aluminum film 203 adhered to the lower surface of the glass plate 103. The transparent film 303 consists of a polymer compound such as Vinylon or nylon.

Figure 6D:
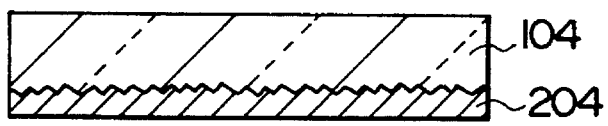

The diffusion reflection mirror 22 in FIG. 6D comprises a glass plate 104 whose lower surface is matted, and an aluminum film 204 deposited on the lower surface of the glass plate 104.

Figure 6E:
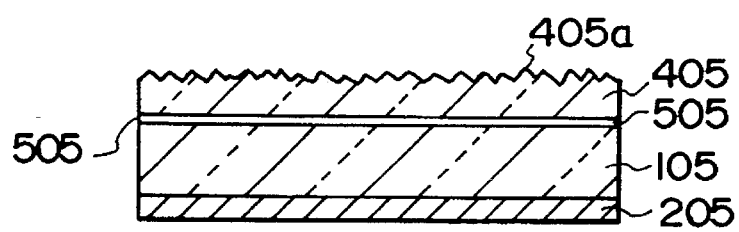

The diffusion reflection mirror 22 in FIG. 6E comprises a first glass plate 105, a second glass plate 405 adhered to the upper surface of the glass plate 105 through an adhesive 505 and having an exposed matted upper surface 405a, and an aluminum film 205 adhered to the lower surface of the first glass plate 105.

Matting is a process for matting the surface of a member. To roughen the surface of the glass plate, fluoronitric acid is applied to the surface of this glass plate, or the surface of the glass plate is polished.

The apparatus comprises a reflection mirror 3 having a normal N30 crossing a normal N4 of the virtual plane VP at an angle A3 of 40° or more and 50° or less and an image sensor 5, arranged in the housing 1, for detecting an image from the target object 10. This image sensor 5 has an image pickup surface 5a for picking up an optical image incident thereon. The image pick up surface 5a is substantially flat. An angle A5 formed between a normal N5 to the image pickup surface 5a and the normal N3 to the virtual plane VP is 85° or more and 95° or less and, more preferably 90°. An image forming lens 4 is arranged in the housing 1. An optical axis OP4 of the image forming lens 4 coincides with the normal N5 to the image pickup surface 5a. An angle A6 formed between the optical axis OP4 and the normal N30 to the reflection mirror 3 is 40° or more and 50° or less, and preferably 45°. A power supply 6 is arranged in the housing 1. A drive power is supplied from the power supply 6 to the CCD or image sensor 5 and the light-emitting unit or light source 23. The component parts 3, 4, 5, 6, 21, 22, and 23 are fixed in the housing 1. These component parts are fixed in the housing 1 as follows.

Figure 4:
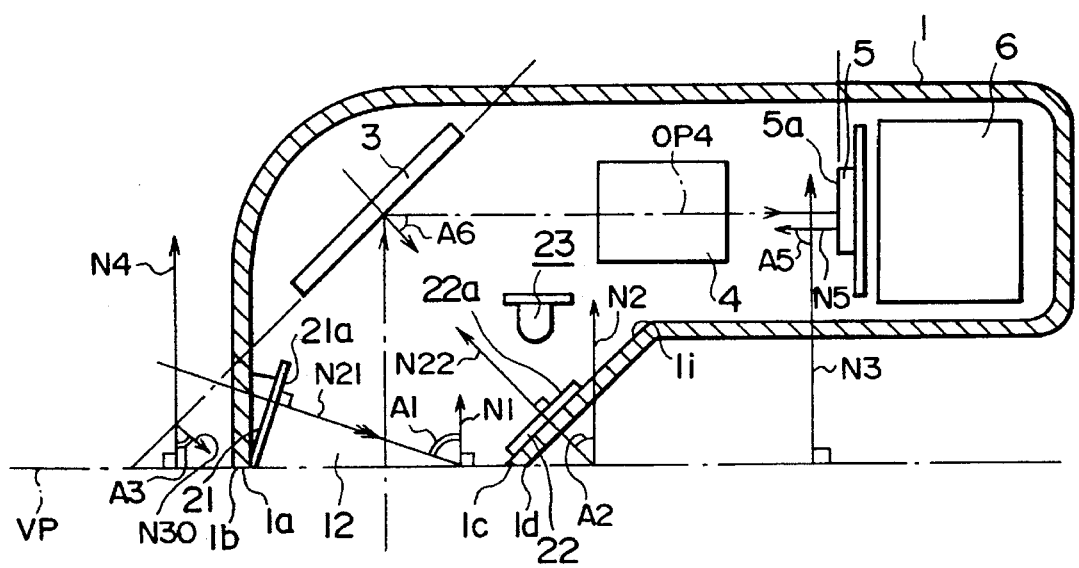
FIG. 4 is a sectional view of the apparatus shown in FIG. 1.
Figure 5:
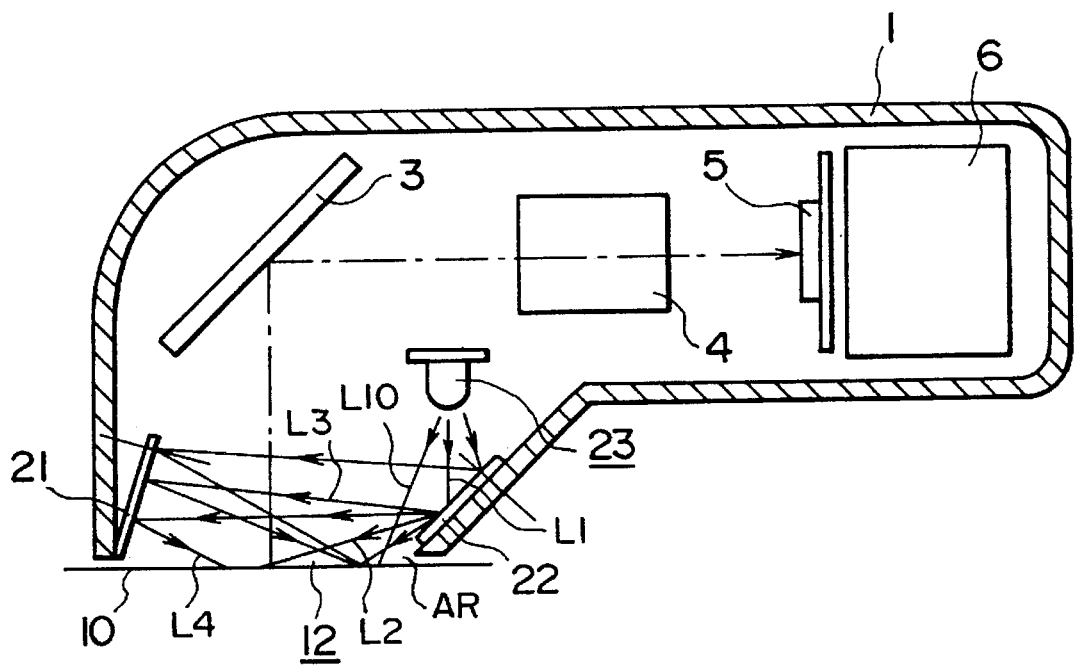
FIG. 5 is a sectional view of the apparatus shown in FIG. 1.

The diffusion reflection mirror 22 is fixed on an inner surface 1i of the housing 1. The inner surface 1i of the housing 1, shown in FIG. 4, is almost parallel to the diffusion reflection surface 22a of the diffusion reflection mirror 22. An angle formed between the surfaces 1i and 22a is less than 5°. The thickness of the diffusion reflection mirror 22 is almost constant. An angle formed between the inner surface 1i and the virtual plane VP is 40° or more and 50° or less. An angle formed between the inner surface 1i and the virtual plane VP is equal to the angle formed between the diffusion reflection surface 22a and the virtual plane VP. For this reason, when the diffusion reflection mirror 22 is fixed on the inner surface 1i, the diffusion reflection mirror 22 can be positioned.

Figure 2:
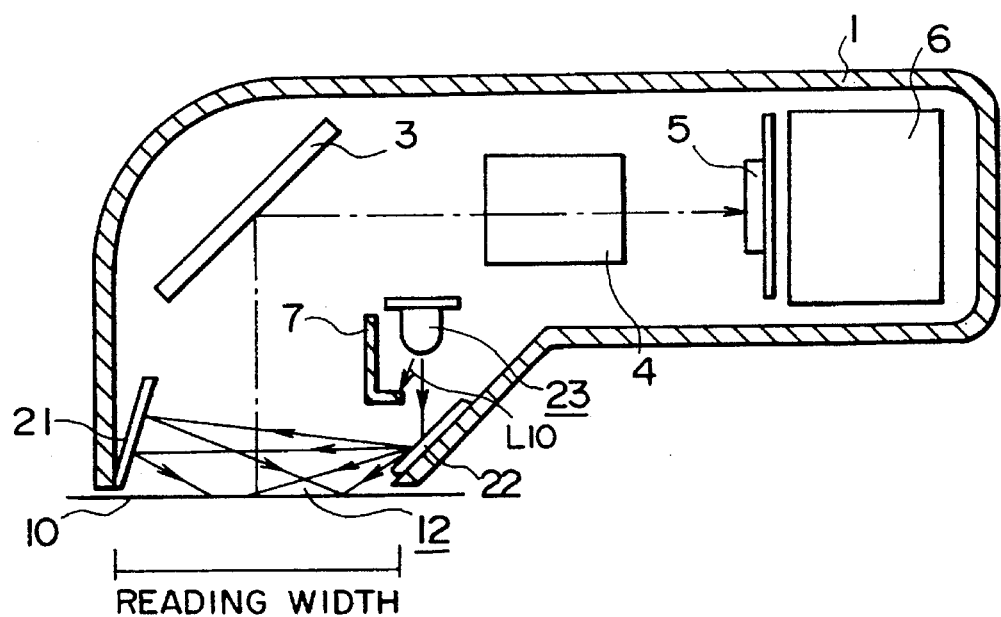
FIG. 2 is a sectional view showing an image reading apparatus according to this embodiment of the present invention.

FIG. 2 shows an apparatus for setting the illuminance on the virtual plane VP more constant. This apparatus comprises a member 7 for shielding light L10 directly incident from the light source 23 to the window 12. The member 7 is fixed to the housing. The light L10 to be shielded does not pass through any medium except for air AR and passes through the window 12 without being reflected by the diffusion reflection mirror 22.

The optical axis OP4 of the image forming lens crosses the image sensor 5 and the reflection mirror 3. An angle formed between the normal N30 to the reflection mirror 3 and the diffusion reflection surface 22a is 85° or more and 95° or less. An angle between the total reflection surface 21a and the diffusion reflection surface 22a is 25° or more and 35° or less.

The image reading apparatus will be described in more detail. The image reading apparatus of this embodiment of the present invention will be described with reference to FIG. 1. As shown in FIG. 1, this image reading apparatus comprises the housing 1 having an L-shaped section and a hollow portion formed therein. The rectangular reading window 12 is formed at one end of this housing 1. The shape of the housing is not limited to the illustrated one. The housing may be a circular or quadrangular cylinder having a hollow portion. The shape of the reading window 12 is not limited to the illustrated one. The reading window 12 may have a trapezoidal shape or a rectangular shape whose one or two sides are curved. An illumination unit is arranged near the reading window 12. This illumination unit has the total reflection plate or mirror 21, the diffusion reflection plate or mirror 22, and the light-emitting unit or light source 23. The total reflection plate 21 is disposed at one side of the reading window 12, and the diffusion reflection plate 22 is disposed at the other side opposing the total reflection plate 21. The light-emitting unit 23 is arranged above the diffusion reflection plate 22.

The diffusion reflection plate 22 is set to have an angle of 45°±5° with respect to the plane including the reading window 12 due to the following reason. Although a relationship between the diffusion reflection plate 22 and the mounting position of the light-emitting unit 23 is important, when an angle formed with the plane including the reading window 12 is small, the illuminance near the diffusion reflection plate 22 is short. However, when this angle is large, the illuminance near the diffusion reflection plate 22 is excessive. For this reason, an angle except for the above angular range may be set depending on relationships with the surface state of the diffusion reflection plate 22, the shape of the diffusion reflection plate 22 itself, or a material and the positional relationship with the light-emitting unit 23. The diffusion reflection plate 22 most preferably comprises a matted mirror whose reflection surface is matted, a member obtained by stacking matted transparent films on a total reflection mirror, or a member obtained by coating matted transparent films (e.g., opaque mat films) on a total reflection mirror. Matting of the diffusion reflection plate may be achieved by utilizing, e.g., a matted aluminum plate or a member obtained by adhering a mirror to the lower surface of ground glass. The "Lanbert's cosine law" is known for the luminous intensity of diffused light. However, the state of the mat surface (i.e., the surface of the diffusion reflection surface 22a) can be changed to arbitrarily set the diffusion characteristics of the diffusion reflection plate 22. The arbitrary setting of the diffusion characteristics facilitates adjustment of an amount of diffused light directly irradiated on the reading surface or target object 10 and an amount of light indirectly irradiated on the reading surface 10 through the total reflection plate 21. As a method of changing the state of a mat surface, when transparent films are to be stacked on a total reflection mirror, the number of transparent films is changed. When transparent films are to be coated on a total reflection mirror, the number of transparent films is changed.

The light-emitting unit 23 comprises a board 231 and LEDs 232 arranged on the board 231. The LEDs 232 are arranged on the board 231 in a single array. However, the LEDs 232 may be arranged in two or more arrays. The light-emitting unit 23 need not be the LEDs 232, but may be another light source such as an incandescent lamp. The light-emitting unit 23 is formed to have a length enough to cover the size of the reading window 12. More specifically, the length of the board 231 of the light-emitting unit 23 is set equal or almost equal to one side of the reading window 12. The number of the LEDs 232 is set to obtain a sufficient amount of light.

The light-emitting unit 23 is set such that the principal direction of light reflected by the diffusion reflection plate 22 is almost parallel to the reading window 12. When the principal direction of the reflected light is set almost parallel to the reading window, a larger amount of light can be reflected toward the total reflection plate 21. At this time, an implementation must be provided to cause the light from the light-emitting unit 23 not to be directly irradiated on the reading surface 10. This can be achieved by changing the orientation of the light-emitting unit 23 and moving its position. Alternatively, the L-shaped light-shielding plate or member 7 may be provided to prevent direct incidence of the light on the reading surface 10, as shown in FIG. 2.

Note that the light source may be various types of light-emitting elements in addition to the LEDs 232, as described above. In this case, some light source may emit light not in one direction but in all directions, i.e., directly irradiate light on not only the diffusion reflection plate 22 but also the reading surface 10. The L-shaped light-shielding plate 7 shown in FIG. 2 can prevent direct incidence of light on the reading surface 10.

The total reflection plate 21 preferably has a maximum area to efficiently reflects light reflected by the diffusion reflection plate 22 toward the reading surface 10. The total reflection plate 21 is set at an angle of 75°±5° with respect to the plane including the reading window 12 due to the following reason. When the angle with the reading window 12 is excessively large, the illuminance near the total reflection plate 21 is short. However, when the angle is excessively small, the illuminance near the total reflection plate 21 is excessively high.

Note that the total reflection plate 21, the diffusion reflection plate 22, and the light-emitting unit 23 are arranged in the housing 1 and are located at positions where the images of these component parts are not formed on the area image sensor 5. Also note that a power supply (not shown) and a switch (not shown) to supply power to the light-emitting unit 23 are arranged in the housing 1.

The reflection mirror 3 is arranged above the reading window 12 in the housing 1. The reflection mirror 3 is mounted to include all image information obtained through the reading window 12 and change the optical path by about 90°. The image forming element or lens 4 is arranged in the optical path. The area image sensor 5 is arranged at the focal point of the image forming element 4. The area image sensor 5 comprises an image pickup element such as a CCD. Both the image forming element 4 and the area image sensor 5 are arranged in the housing 1. Various circuits and the power supply 6, all of which serve as peripheral components for the area image sensor 5, are also arranged in the housing 1.

An operation of the image reading apparatus according to the embodiment of the present invention will be described with reference to FIG. 2.

Prior to the operation of the image reading apparatus, the image reading apparatus is set to cover image information on the reading surface within the reading window 12.

A power switch is turned on to power the LEDs 232 of the light-emitting element 23, thereby causing the LEDs 232 to emit light. The light from the LEDs 232 is reflected by the diffusion reflection plate 22 in a predetermined direction. Part of the reflected light is irradiated on the reading surface 10, and the remaining part of the reflected light is guided to the total reflection plate 21 opposing the diffusion reflection plate 22. The light directly irradiated from the diffusion reflection plate 22 to the reading surface 10 is irradiated such that a reading surface portion closer to the diffusion reflection plate 22 is bright, and a reading surface portion farther away from the diffusion reflection plate 22 is dark. The light irradiated on the total reflection plate 21 is secondarily reflected to irradiate the reading surface 10 such that a reading surface portion closer to the total reflection plate 21 is bright, and a reading surface portion farther away from the total reflection plate 21 is dark. In this embodiment, the diffusion reflection plate 22 is set to have an angle of 45°±5° with respect to the plane including the reading window 12, and the principal direction of the light reflected by the diffusion reflection plate 22 becomes almost parallel to the reading window 12. A larger amount of reflected light can be guided to the total reflection plate 21. At the same time, the total reflection plate portion closer to the diffusion reflection plate 22 is bright, while the total reflection plate portion farther away form the diffusion reflection plate 22 is dark. The total reflection plate 21 is set to have an angle of 75°±5° with respect to the plane including the reading window 12. For this reason, light irradiated on the total reflection plate 21 can be secondarily and efficiently reflected toward the reading surface 10. By this light, the reading surface portion closer to the total reflection plate 21 is bright, while the reading surface portion farther away from the total reflection plate 21 is dark. That is, the principal direction of the light secondarily reflected by the total reflection plate 21 has an angle of about 30° with respect to the horizontal direction of the reading window 12. The incident angle of the light directly irradiated from the diffusion reflection plate 22 to the reading window 12 is also set almost 30°, thereby equalizing the illumination states. Therefore, the illumination state of the reading window 12 can be equalized.

The light-emitting unit 23 is arranged near the reading window 12, and at the same time, light from the total reflection plate 21 is synthesized with light from the diffusion reflection plate 22. For this reason, the reading window 12 can be sufficiently irradiated even if an amount of light from the light-emitting unit 23 is small. Therefore, since the light amount from the light-emitting unit 23 can be small, the power supplied to the LEDs 232 can be low.

Figure 3:
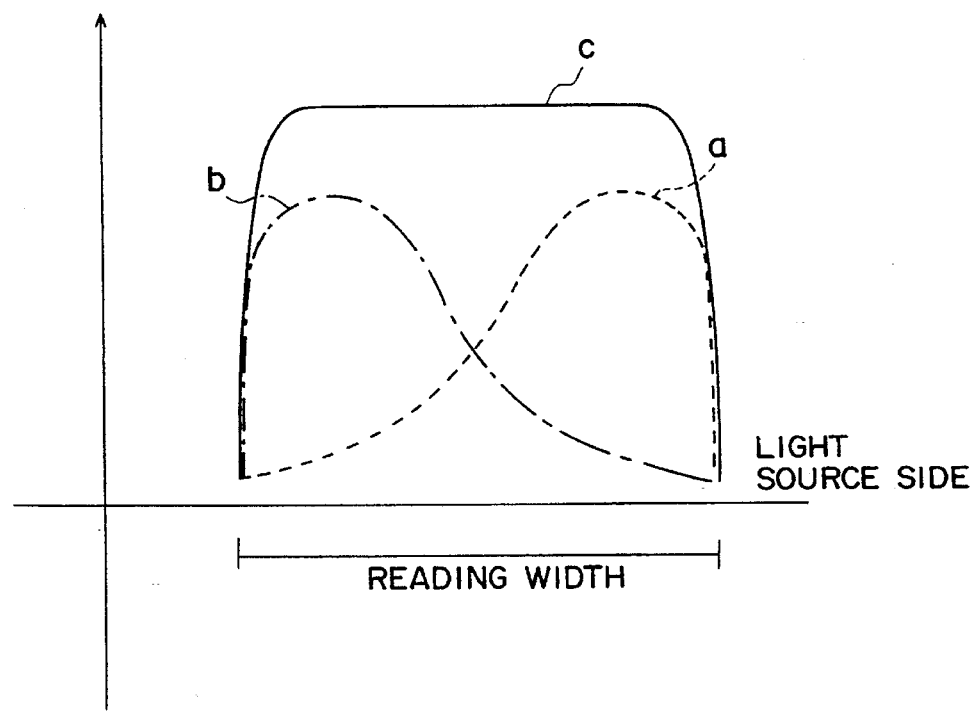
FIG. 3 is a graph showing the illuminance distribution on the reading surface of the image reading apparatus of this embodiment.

The corresponding illuminance distribution is shown in FIG. 3. A characteristic curve a indicates the illuminance distribution of diffused light directly incident from the diffusion reflection plate 22. A characteristic curve b indicates the illuminance distribution of the secondary reflection from the total reflection plate 21, i.e., the light irradiated by total reflection. A characteristic curve "c" indicates the actual illuminance distribution obtained by synthesizing the characteristics represented by the characteristic curves "a" and "b" shown in the figure. The ordinate in FIG. 3 represents the illuminance of the reading surface 10, while the abscissa represents the position of the reading surface 10 (the right side along the abscissa represents the diffusion reflection plate side, while the left side represents the total reflection plate side).

Since the reading window 12 is irradiated as described above, the reading surface 10 can be uniformly and brightly irradiated, and image information having a sufficiently large light amount can be formed on the area image sensor 5 through the reflection mirror 3 and the image forming element 4. This image information is converted into an electrical signal by the area image sensor 5, and the electrical signal is output. Therefore, the image information is transmitted to various units connected to this image reading apparatus.

As described above, according to the image reading apparatus of this embodiment, part of light received by the diffusion reflection plate 22 is reflected toward the reading surface 10, so that the reading surface portion closer to the diffusion reflection plate 22 is bright, and the reading surface portion farther away from the diffusion reflection plate 22 is dark. In addition, since the light received by the total reflection plate 21 is reflected toward the reading surface 10, the reading surface portion closer to the total reflection plate 21 is bright, and the reading surface portion farther away from the total reflection plate 21 is dark.

The angle formed between the diffusion reflection plate 22 and the plane including the reading window 12 is set to 45°±5°. The principal direction of the light reflected by the diffusion reflection plate 22 can be efficiently parallel to the reading window 12. The angle formed between the total reflection plate 21 and the plane including the reading window 12 is set to 75°±5°. Therefore, most of the light reflected by the total reflection plate 21 can be efficiently irradiated on the reading window 12.

The illuminance distribution of the reading surface 10 is averaged, and the total reading surface 10 can be uniformly and brightly irradiated.

The light-emitting unit 23 is arranged near the reading window 12, and at the same time, the light from the total reflection plate 21 is synthesized with the light from the diffusion reflection plate 22. Therefore, the reading window 12 can be sufficiently illuminated even with a smaller amount of light from the light-emitting unit 23 than in the conventional image reading apparatus.

According to the present invention, the two light-emitting units 23 and the two diffusion plates in the prior art need not be used, and the object of the present invention can be achieved by an arrangement comprising only the light-emitting unit 23, the diffusion reflection plate 22, and the total reflection plate 21. Therefore, the number of component parts in the present invention can be smaller than that in the prior art. As a result, a compact image reading apparatus can be obtained.

The number and thickness of transparent films stacked or coated on a total reflection mirror can be changed to change the degree of matting of the surface of the diffusion reflection plate 22, so that the amount of light reflected toward the total reflection plate and the amount of light reflected toward the reading window can be adjusted. Therefore, the illuminance on the reading surface can be set to a desired value.

As has been described in detail, according to the image reading apparatus of the present invention, by the light reflected by the diffusion reflection plate, the reading surface portion closer to the diffusion reflection plate is bright, and the reading surface portion farther away from the diffusion reflection plate is dark. In addition, by the light reflected by the total reflection plate, the reading surface portion closer to the total reflection plate is bright, and the reading surface portion farther away from the total reflection plate is dark. For this reason, the illuminance distribution of the total reading surface is averaged, and the total reading surface is uniformly and brightly irradiated.

The amount of light reflected toward the total reflection plate and the amount of light reflected toward the reading window can be easily adjusted. Therefore, the illuminance of the reading surface can be set to a desired value.

The light-emitting unit is arranged near the reading window, and at the same time, the light from the total reflection plate is synthesized with the light from the diffusion reflection plate. Therefore, the reading window can be sufficiently illuminated even with a smaller amount of light from the light-emitting unit than that in the conventional image reading apparatus.

According to the present invention, the two light-emitting units and the two diffusion plates in the prior art need not be used, and only the light-emitting unit, the diffusion reflection plate, and the total reflection plate are used. Therefore, the number of component parts in the present invention can be smaller than that in the prior art.

The reading surface can be uniformly and stably irradiated with a smaller number of component parts. The reading performance can be stabilized and improved accordingly, thereby obtaining a compact image reading apparatus. In addition, even if an amount of light from the light-emitting unit is small, the reading window can be sufficiently irradiated, and the power supplied to the light-emitting unit can be low.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 14574/1994 filed on Feb. 8, 1994 is hereby incorporated by reference.

What is claimed is:

1. An apparatus for reading an image on a target object, comprising:

(a) a housing having a window surrounded by an opening edge;

(b) a light source arranged in said housing;

(c) a total reflection mirror arranged in said housing; and (d) a diffusion reflection mirror arranged between said light source and a part of an inner wall of said housing, wherein an angle between a normal to a virtual plane including three points on said opening edge and a normal to said total reflection mirror is not less than 70° and not more than 80°, and wherein an angle between the normal to the virtual plane and a normal to said diffusion reflection mirror is not less than 40° and not more than 50°, and wherein the distance between said light source and said diffusion reflection mirror is less than the distance between said light source and said total reflection mirror.

2. An apparatus according to claim 1, wherein said diffusion reflection mirror has a diffusion reflection surface for diffusing and reflecting light incident thereon, said diffusion reflection surface being matted.

3. An apparatus according to claim 2, wherein said diffusion reflection mirror comprises a glass plate and a matted aluminum film formed on said glass plate.

4. An apparatus according to claim 2, wherein said diffusion reflection mirror comprises a glass plate whose upper surface is matted, and an aluminum film adhered to a lower surface of said glass plate.

5. An apparatus according to claim 2, wherein said diffusion reflection mirror comprises a glass plate, a matted transparent film adhered to an upper surface of said glass plate, and an aluminum film adhered to a lower surface of said glass plate.

6. An apparatus according to claim 2, wherein said diffusion reflection mirror comprises a glass plate whose lower surface is matted, and an aluminum film deposited on said lower surface of said glass plate.

7. An apparatus according to claim 2, wherein said diffusion reflection mirror comprises a first glass plate, a second glass plate adhered to an upper surface of said first glass plate through an adhesive and having an exposed matted upper surface, and an aluminum film adhered to a lower surface of said first glass plate.

8. An apparatus according to claim 1, wherein said apparatus comprises:

a reflection mirror having a normal crossing the normal to the virtual plane at an angle of not less than 40° and not more than 50°; and an image sensor, arranged in said housing, for detecting the image from the target object, and the image from the target object is reflected by said reflection mirror and detected by said image sensor.

9. An apparatus according to claim 1, comprising a member for shielding light directly incident from said light source to said window.

10. An apparatus according to claim 9, wherein the light to be shielded does not pass through any medium except for air and passes through said window without being reflected by said diffusion reflection mirror.

11. An apparatus according to claim 1, wherein said housing has an inner surface crossing the virtual plane at an angle of not less than 45° and not more than 50°, and said diffusion reflection mirror is fixed on said inner surface.

12. An apparatus for reading an image on a target object, comprising:

(a) a housing having a window surrounded by an opening edge;

(b) a light source arranged in said housing;

(c) a total reflection mirror arranged in said housing and having a total reflection surface for totally reflecting light incident thereon;

(d) a diffusion reflection mirror arranged in said housing and having a diffusion reflection surface for diffusing and reflecting light incident thereon;

(e) an image sensor, arranged in said housing, for picking up the image of the target object; and (f) a reflection mirror, arranged in said housing, for reflecting the image of the target object which has passed through said window toward said image sensor, wherein an angle formed between a normal to a virtual plane including three points on said opening edge and a normal to said total reflection mirror is not less than 70° and not more than 80°, and an angle formed between the normal of the virtual plane and a normal to said diffusion reflection mirror is not less than 40° and not more than 50°, and said diffusion reflection mirror is arranged between said light source and the virtual plane.

13. An apparatus for reading an image on a target object, comprising:

(a) a housing having a window surrounded by an opening edge;

(b) a light source arranged in said housing;

(c) a total reflection mirror arranged in said housing and having a total reflection surface for totally reflecting light incident thereon;

(d) a diffusion reflection mirror arranged in said housing on an optical axis of said light source and having a diffusion reflection surface for diffusing and reflecting light incident thereon;

(e) an image sensor, arranged in said housing, for picking up the image of the target object; and (f) a reflection mirror, arranged in said housing, for reflecting the image of the target object which has passes through said window toward said image sensor, and (g) an image forming lens arranged between said image sensor and said reflection mirror, wherein the optical axis of said image forming lens crosses said image sensor and said reflection mirror, an angle formed between a normal to said reflection mirror and said diffusion reflection surface is not less than 85° and not more than 95°, and an angle formed between said total reflection surface and said diffusion reflection surface is not less than 25° and not more than 35°.

14. An apparatus for reading an image on a target object, comprising:

(a) a housing having a window surrounded by an opening edge;

(b) a light source arranged in said housing;

(c) a total reflection mirror arranged in said housing; and (d) a diffusion reflection mirror for reflecting a part of the light emitted from said light source toward said window and at the same time reflecting another part of the light emitted from said light source toward said total reflection mirror, wherein light reflected by said total reflection mirror is guided to said windows, and wherein the distance between said light source and said diffusion reflection mirror is less than the distance between said light source and said total reflection mirror.

* * * * *